Aug. 25, 1953 E. C. LA VOQUE 2,649,817
TRANSMISSION
Filed May 26, 1949 3 Sheets-Sheet 1

INVENTOR.
EDWARD C. LA VOQUE
BY HIS ATTORNEYS.
HARRIS, KIECH, FOSTER & HARRIS

Aug. 25, 1953 E. C. LA VOQUE 2,649,817
TRANSMISSION
Filed May 26, 1949 3 Sheets-Sheet 2

INVENTOR.
EDWARD C. LA VOQUE
BY HIS ATTORNEYS.
HARRIS, KIECH, FOSTER & HARRIS

Aug. 25, 1953     E. C. LA VOQUE     2,649,817
TRANSMISSION
Filed May 26, 1949     3 Sheets-Sheet 3
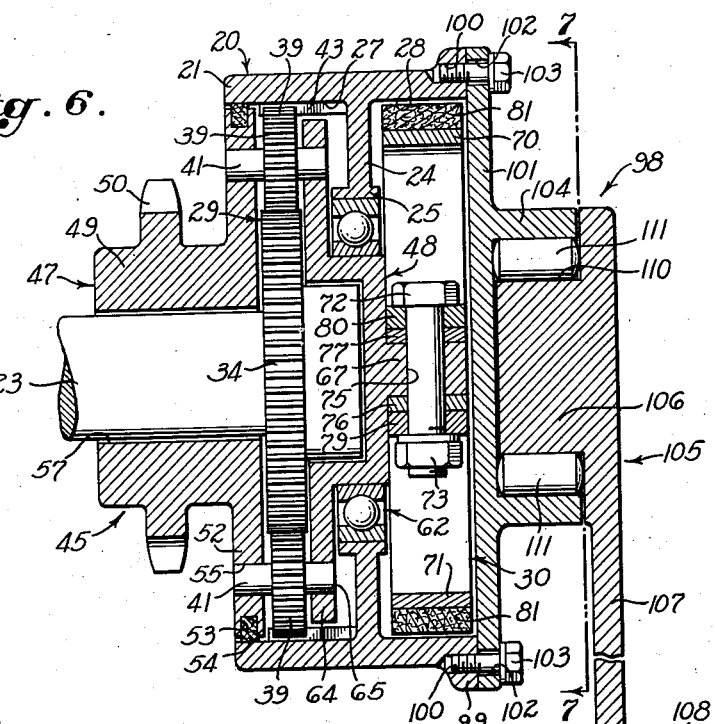
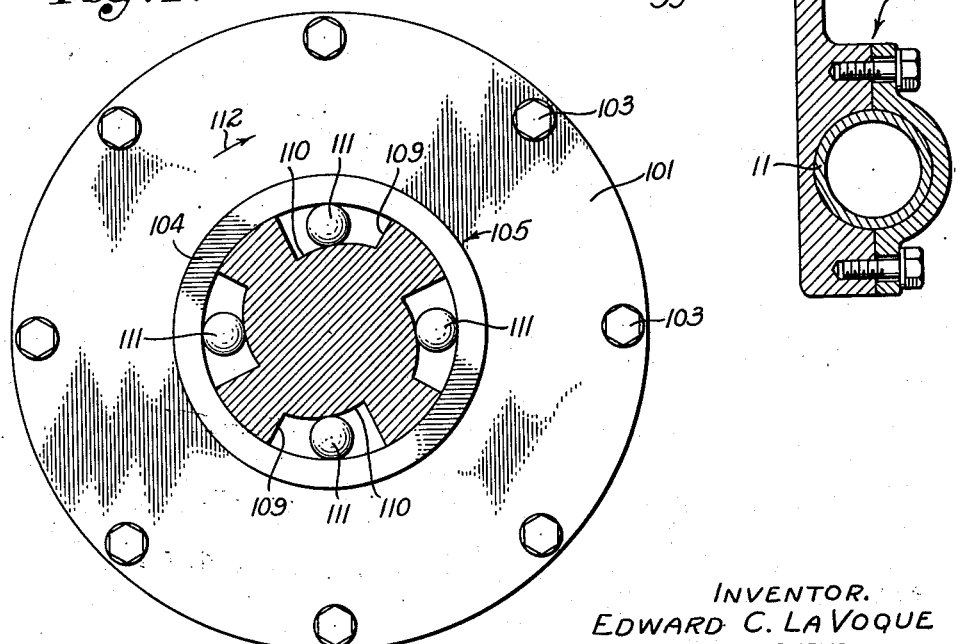
INVENTOR.
EDWARD C. LA VOQUE
BY HIS ATTORNEYS.
HARRIS, KIECH, FOSTER & HARRIS Patented Aug. 25, 1953

2,649,817

UNITED STATES PATENT OFFICE 2,649,817

TRANSMISSION

Edward C. La Voque, Hawthorne, Calif., assignor of one-half to Walter E. Chisholm, Van Nuys, Calif.

Application May 26, 1949, Serial No. 95,545

3 Claims. (Cl. 74—785)

This invention relates to improvements in transmissions and more particularly to a transmission of the two-stage type, the first stage being embodied in a planetary gearing system and the second stage being embodied in a centrifugal clutch adapted to be activated through the first stage planetary gearing system.

To facilitate the description of a transmission constructed in accordance with my invention, it is described as being utilized in conjunction with the power plant of a light vehicle, such as a "scooter," but it is not intended, of course, that the transmission of my invention be limited to such a specific use since it is obvious that it has many other worth-while applications.

A primary object of my invention is the provision of a transmission whose operation can be controlled either manually or automatically by making minor modifications in the controlling means embodied in the transmission. This is an important feature since it permits the manufacture of one basic unit which is adapted, by the provision of alternative controlling means, to meet the needs of the user for either manual or automatic controls.

Another object of my invention is the provision of a transmission for light vehicles which permits the two-speed operation of said vehicles and which materially increases the maneuverability and operating range of said vehicles. A concomitant object of my invention is the provision of a transmission of the aforementioned type which can be readily incorporated in already existing vehicles in place of the conventional transmission embodied therein.

An additional object of my invention is the provision of a transmission for a light vehicle which can be readily shifted from low into high gear by voluntarily or manually retaining the transmission in low gear until gear-changing speed has been reached and then releasing the controlling means of the transmission to permit the transmission to go into high gear automatically without any manual manipulation upon the part of the individual controlling the vehicle other than the release of the controlling means which was initially utilized to place the transmission in low gear.

Another object of my invention is the provision of a two-speed transmission which has embodied therein automatic controlling means designed to retain the transmission in low gear until the centrifugal clutch embodied in the transmission automatically throws it into high gear.

A further object of my invention is the provision of a two-speed transmission which, when the transmission is in high gear, rotates as a unit so that none of the moving parts utilized in low gear is rotated, thus materially reducing the wear experienced in conventional transmissions upon such parts.

A further object of my invention is the provision of a two-speed transmission which is adapted for use as a brake in decelerating the vehicle with which it is associated, thus eliminating frequent recourse to the wheel brakes of the vehicle and materially increasing the life of said wheel brakes. This desirable end is achieved because, when the vehicle decelerates sufficiently to automatically throw the transmission out of high gear, the manual or automatic control means is brought into play to compel accelerative forces to pass through the first or low speed stage of the transmission and thus the speed of the vehicle is materially reduced without the necessity for the application of the wheel brakes thereof.

Another object of my invention is the provision of a transmission of the aforementioned type which incorporates centrifugal clutch means adapted to throw the transmission automatically into high gear when a predetermined speed is reached. The clutch means is more fully described in my copending application Serial No. 82,443, filed on March 19, 1949.

An additional object of my invention is the provision of a two-stage transmission which is embodied in a unitary housing and which is sufficiently light weight to permit it to be incorporated in relatively small vehicles or to be otherwise utilized where conventional bulky and heavy transmissions cannot be used.

A further object of my invention is the provision of a two-speed transmission which consists of a minimum number of interchangeable parts which can be easily and simply replaced. A concomitant object of my invention is the provision of a transmission of the aforementioned type which includes a minimum number of such parts and which may be easily and cheaply manufactured and assembled.

Other objects and advantages of my invention may be ascertained from a consultation of the following specification and the accompanying drawings, which are for the purpose of illustration only, and in which:

Fig. 6 is a vertical sectional view showing the transmission of my invention equipped with an automatic controlling means adapted to automatically retain the transmission in low gear until the centrifugal clutch means automatically throws the transmission into high gear; and, Fig. 7 is a partly sectional, partly elevational view taken on the broken line 7—7 of Fig. 6.

Figure 1:
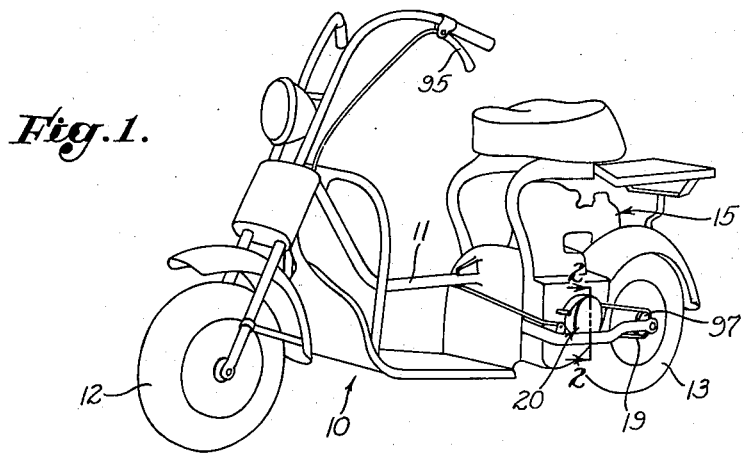
Fig. 1 is a perspective view showing a light vehicle of the type in which a transmission constructed in accordance with my invention is adapted to be installed.
Figure 2:
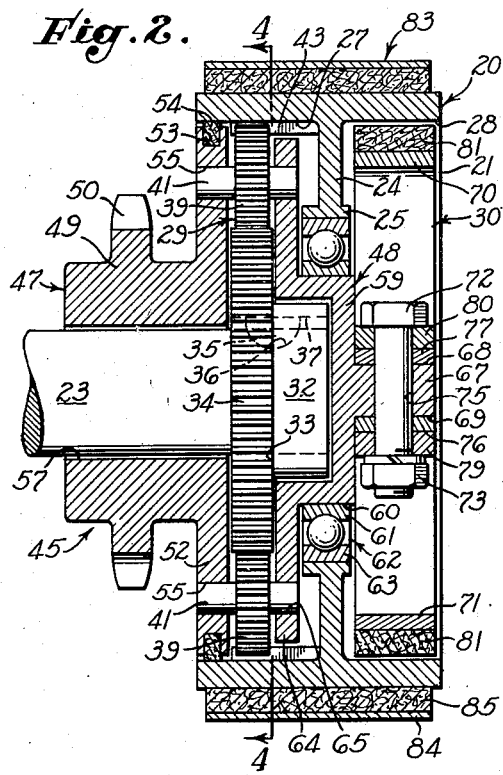
Fig. 2 is a vertical sectional view taken on the broken line 2—2 of Fig. 1 and shows the transmission as the component parts thereof appear when it is in low gear.
Figure 3:
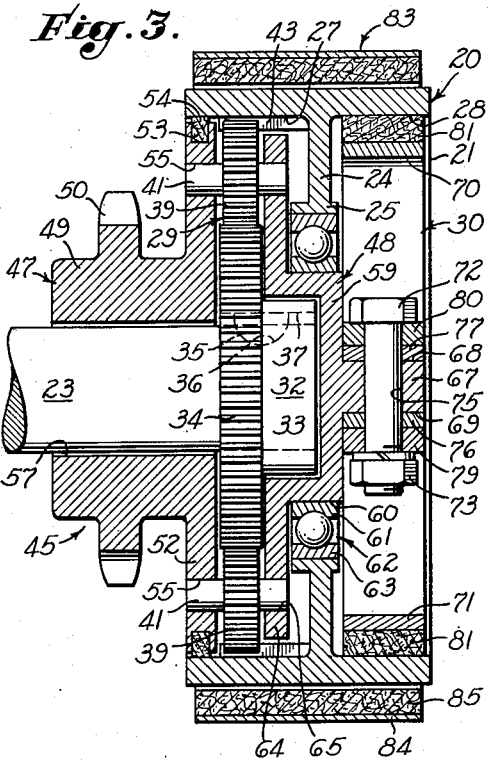
Fig. 3 is a vertical sectional view similar to that of Fig. 2 but showing the component parts of the transmission in the position they respectively assume when the transmission is in high gear.

Referring to the drawings, and particularly to Fig. 1 thereof, I show a light, two-wheeled vehicle 10, commonly known as a "scooter" and having a frame 11 upon the forward end of which is mounted a steering wheel 12 and upon the rear end of which is mounted a driving wheel 13. A power plant 15 is mounted on the frame 11 adjacent the driving wheel 13 and is adapted to provide the motive power for the vehicle 10.

Mounted upon the power plant 15 in a manner which will be disclosed in greater detail below, is a transmission 20 which is adapted to transmit power from the power plant 15 to the driving wheel 13 of the vehicle 10 through the medium of a sprocket chain 19. Referring now to Figs. 2 through 5 of the drawings, the transmission 20 includes a rotatable housing 21 which is generally cylindrical in shape and which is adapted to be mounted upon the drive shaft 23 of the power plant 15 of the vehicle. The housing 21 has formed upon the interior surface thereof an inwardly projecting annular partition 24 which has integrally formed thereupon a mounting flange 25 for a purpose which will be described in greater detail below. The annular partition 24 of the housing 21 divides the interior of the housing into a gear chamber 27 and a clutch drum 28.

Disposed within the gear chamber 27 of the housing 21 is a gear train 29 which serves as the low-gear stage of the transmission 20 and disposed within the clutch drum 28 of the housing 21 is a clutch means 30 which serves as the high-gear stage of the transmission 20.

Figure 4:
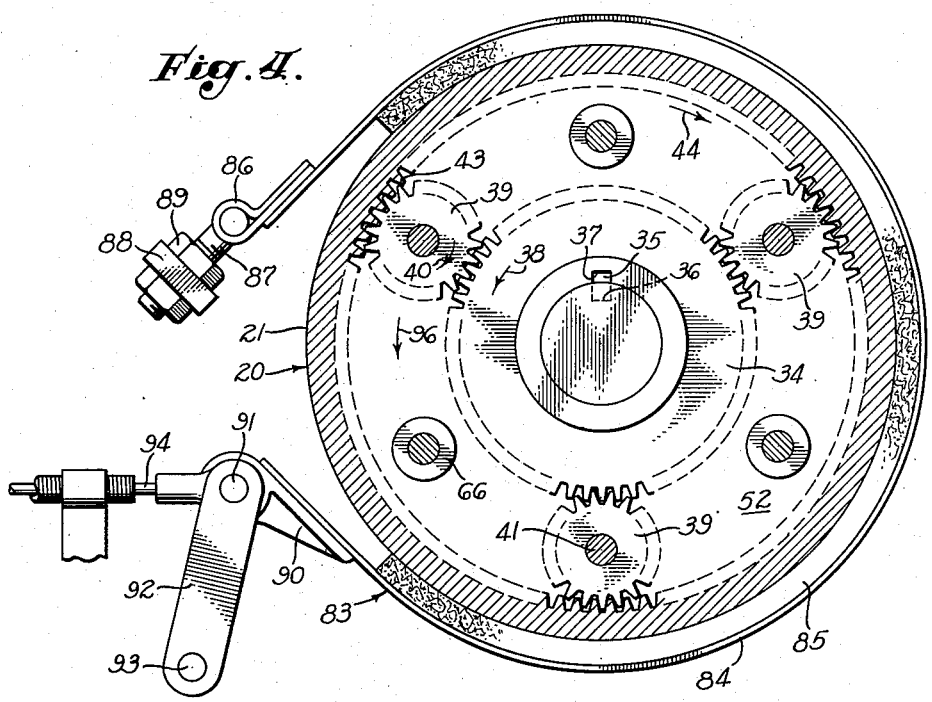
Fig. 4 is a partly sectional, partly elevational view taken on the broken line 4—4 of Fig. 2.
Figure 5:
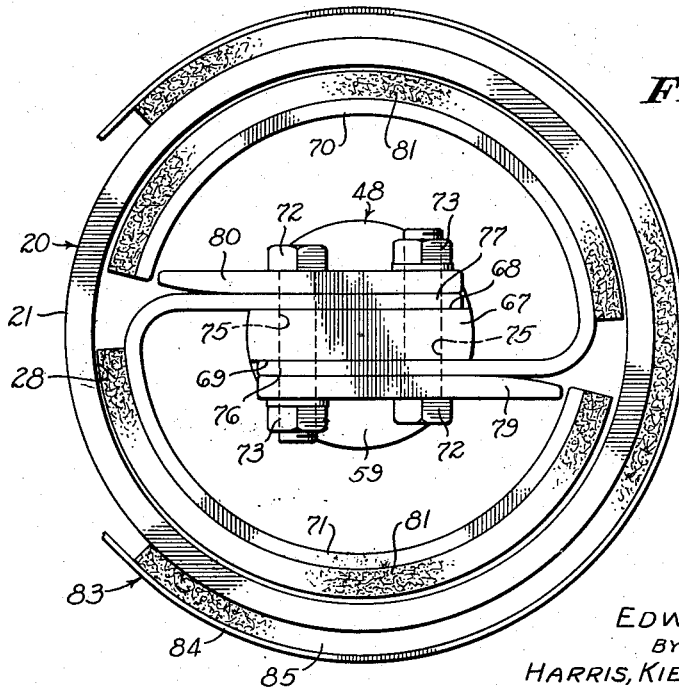
Fig. 5 is a vertical sectional view showing the clutch means of my invention in low gear.

Integrally formed upon the end of the engine drive shaft 23 is an enlarged, annular portion 32 which provides a shoulder 33 against which is positioned a sun gear 34 which is affixed to and rotates with the drive shaft 23 through the medium of a key 35, as best shown in Fig. 4, which is adapted to be inserted in contiguous keyways 36 and 37 formed respectively in the enlarged, annular portion 32 and the sun gear 34. As best shown in Fig. 4 of the drawings, the sun gear 34 is adapted to be rotated by the engine drive shaft 23 in a counterclockwise direction, the arrow 38 indicating the counterclockwise direction of rotation. Meshed with the sun gear 34 and adapted to be rotated thereby in both their minor and major orbits are planetary gears 39. The planetary gears 39, as best shown in Fig. 4 of the drawings, are adapted to be rotated in a clockwise direction, as indicated by the arrow 40 when the sun gear 34 is rotated in a counterclockwise direction by the action of the engine shaft 23. The planetary gears 39 are adapted to be rotated upon spindles 41 which are mounted in a manner which will be described in greater detail below.

Disposed within and integrally formed with, the interior of the gear casing 27 is a ring gear 43 which, if the housing 21 of the transmission 20 is unrestrained, will be rotated in a clockwise direction, that is, in the direction indicated by the arrow 44 in Fig. 4 of the drawings.

Positioned within the interior of the housing 21 and projecting from one side thereof is a driven means 45 which consists of a first portion 47 and a second portion 48. The first portion 47 of the driven means 45 includes a generally annular hub section 49 which has integrally formed thereupon a sprocket 50 located externally of the housing 21 of the transmission 20. The sprocket 50 constitutes the means by which the power transmitted from the drive shaft 23 through the transmission 20 is transmitted to the sprocket chain 19 and thence into the driving wheel 13 of the vehicle. Formed upon the inner end of the first portion 47 of the driven means 45 is a mounting and closure plate 52 which has an annular groove 53 formed in its peripheral edge and which is adapted to receive a sealing element or ring 54 which seals the interior of the gear casing 27 to prevent the leakage of lubricating oil from the interior of the gear casing. Thus, the first portion 47 of the driven means 45 provides a closure plate for the gear casing 27 and a seal means therefor and, in addition, provides a driving sprocket for the sprocket chain 19. A plurality of openings 55 formed in the plate 52 are adapted to receive the ends of the planetary gear mounting spindles 41 and thus permit the plate 52 to serve, in part, as a mounting means for the planetary gears 39.

A central bore 57 is formed in the first portion 47 of the driven means 45 and is adapted to receive the end of the drive shaft 23 to permit the rotation of the driven means 45 about the periphery of the drive shaft 23. It is thus seen that the first portion 47 of the driven means 45 constitutes that portion of the driven means which projects from the interior of the housing 21.

The second portion 48 of the driven means 45 is positioned partially within the gear casing 27 and partially within the clutch drum 28 but no portion thereof projects from the interior of the housing 21 to the exterior thereof. The second portion 48 of the driven means 45 includes a substantially cylindrical central portion 59 which overlies the annular end 32 of the drive shaft 23 and which provides a seat or shoulder 60 upon which is mounted the inner race 61 of a ball bearing 62, the outer race 63 of which is pressed into the annular flange 25 formed upon the annular partition 24 of the housing 21. In this manner, relative rotation of the driven means 45 and particularly the second portion 48 thereof with reference to the housing 21 of the transmission 20, is permitted.

Formed integrally with the cylindrical central portion 59 of the second portion 48 of the driven means 45 is a circular mounting plate 64 which has formed therein a plurality of openings 65 adapted to receive the other ends of the mounting spindles 41 of the planetary gears 39. Thus, the mounting plates 52 and 64 of the first and second portions of the driven means 45 provide mounting means for the spindles of the planetary gears within the gear casing 27 and thus hold the planetary gears in mesh with both the sun gear 34 and the ring gear 43. A plurality of bolts 66, Fig. 4, serve to hold the mounting plates 52 and 64 together and to transmit the action of the clutch means 30 from the second portion 48 of the driven means 45 into the first portion 47 thereof in a manner described in greater detail below.

Formed integrally with and projecting from the center of the cylindrical central portion 59 of the second portion 48 of the driven means 45 is a spud 67 which is of generally rectangular cross-sectional configuration and which is adapted to support the clutch means 30 which is housed within the clutch drum 28 of the housing 21. The spud 67 provides opposed flat, mounting faces 68 and 69 adapted to provide a mounting means for oppositely disposed clutch shoes 70 and 71 which are adapted to be mounted thereupon through the medium of bolts 72 and nuts 73, the bolts 72 having their shanks passing through spaced openings or bores 75 formed in the spud 67 and extending from the mounting face 68 to the mounting face 69.

The clutch shoes 70 and 71 are generally of arcuate configuration and have horizontal base portions 76 and 77 which are secured to the opposite faces 69 and 68 respectively of the spud 67. Secured adjacent the base portions 76 and 77 of the shoes 70 and 71 are motion-limiting means 79 and 80 which are adapted to prevent the undue deflection of the base portions 76 and 77 of the shoes 70 and 71 in a manner which is described in greater detail in my aforementioned copending application. Affixed to the arcuate surfaces of the clutch shoes 70 and 71 are blocks 81 of clutch facing which are adapted to be urged into contact with the interior of the clutch drum 28 of the housing 21 by the centrifugal expansion of the clutch shoes 70 and 71 when they are rotated at a predetermined speed upon the spud 67 within the interior of the clutch drum 28. As heretofore indicated, the clutch means 30 serves as the second or high-gear stage of the transmission.

Located externally of the transmission housing 21 is a manually actuatable controlling means 83 which consists of a substantially annular brake band 84, the band being somewhat flexible to permit the expansion and contraction thereof in a manner which will be described in greater detail below. The band 84 encircles the major portion of the periphery of the transmission housing 21 and supports a block 85 of friction material in close contiguity thereto. One end of the band 84 has a loop 86 fixedly attached thereto, said loop being adapted to receive one end of a bolt 87, the other end of which is received in a bracket 88 attached to the frame 11 of the vehicle and which is adapted to be retained therein by means of adjusting nuts 89. A fitting 90 is secured to the other end of the brake band 84, said fitting being pivotally mounted at 91 upon a lever 92 which, in turn, is pivotally mounted upon the frame 11 of the vehicle at 93. Secured to the end of the fitting 90 is a flexible control cable 94 which terminates adjacent the steering handles of the vehicle 10 and which is fastened to a control handle 95 mounted upon one of said handles. Thus, when the control handle 95 of the controlling means is brought upwardly into contact with the steering handle upon which it is mounted, the cable 94 is shifted to the left, as viewed in Fig. 4 of the drawings, to cause the fitting 90 to be carried upon the upper end of the lever 92 to the left to sufficiently flex the flexible brake band 84 to bring the block of friction material 85 into contact with the surface of the housing 21 to prevent the rotation thereof in a manner which will be described in greater detail below.

When the individual riding the scooter starts the engine 15 thereof and the drive shaft 23 of the engine is thus caused to rotate in a counterclockwise direction, as seen in Fig. 4 of the drawings, the concomitant counterclockwise rotation of the sun gear 34 causes the clockwise rotation of the planetary gears 39 and the concomitant clockwise rotation of the ring gear 43, thus causing the simultaneous rotation of the entire transmission housing 21. In such a condition the transmission 20 is in idle and the power transmitted thereto from the drive shaft 23 is dissipated in the rotation of the housing 21. When the rider of the vehicle desires to throw the transmission into low gear, he squeezes up on the handle 95 and shortens the cable 94 relative to the flexible brake band 84 to cause the brake band 84 and its associated friction block 85 to be drawn into braking contact with the peripheral surface of the housing 21. When this action takes place, the housing, which has previously been rotating in a clockwise direction, is now held by the action of the controlling means against rotation and its associated ring gear 43 is also held against rotation. Thus, the torque transmitted by the drive shaft 23 into the sun gear 34 and transmitted from the sun gear 34 into the planetary gears 39 can no longer be dissipated through the ring gear 43 and the planetary gears 39 begin to rotate in their major orbits in a counterclockwise direction as indicated by the arrow 96 of Fig. 4 of the drawings. When the planetary gears 39 are rotated in their major orbits by the action of the sun gear 34, the driven means 45 is carried around in the same direction through the medium of its connection with the planetary gears 39 by means of the spindles 41 of said planetary gears. Thus, the counterclockwise rotation of the planetary gears in their major orbits is transmitted to the first portion 47 of the driven means 45 causing the counterclockwise rotation of the sprocket 50 mounted upon the first portion 47 of said driven means. The counterclockwise movement of the sprocket 50 is transmitted through the sprocket chain 19 to a sprocket 97 mounted upon the driving wheel 13, causing the rotation of said wheel.

The transmission, when in low gear, as above described, delivers the torque transmitted by the drive shaft 23 to the driving wheel 13 of the vehicle by means of the gear train 29 housed within the gear casing 27. The gear reduction embodied in the gear train 29 can, as is well known in the art, be controlled by the proportioning of the size of the planetary gears 39 to the sun gear 34, but in the present instance, a reduction of 2:1 has been found to be most desirable.

As the driven means 45 is rotated in a counterclockwise direction by the action of the planetary gears 39, the second portion 48 thereof is also rotated in said counterclockwise direction and the clutch means 30 thereof is deflected by the centrifugal force induced by its rotation upon the second portion of the driven means. When the power plant 15 has been brought up to the maximum low gear speed, the clutch shoes 70 and 71 of the clutch means 30 are urged by centrifugal force into contact with the interior of the clutch drum 28 of the transmission housing 21. When the clutch shoes 70 and 71 contact the interior of the clutch drum 28, the rider of the vehicle releases the controlling handle 95 of the control means 83, thus permitting the retraction of the brake band 84 and its associated friction block 85 from contact with the peripheral area of the housing 21. The frictional contact of the clutch shoes 70 and 71 with the interior of the clutch drum 28 locks the driven means 45 against rotation in reference to the housing 21. Therefore, relative rotation between the sun gear 34, the planetary gears 39, and the ring gear 43 ceases and the entire transmission rotates as a unit in a counterclockwise direction as indicated by the arrow 96 in Fig. 4 of the drawings. This is a very important feature of my invention since the wear customarily encountered in conventional transmissions where power is normally transmitted through the gears of the transmission at all gear stages is eliminated.

When the vehicle is being driven at varying speeds, it is possible to control the speed thereof by manipulating the controlling handle 95 of the controlling means 83 to bring the brake band 84 and its associated friction block 85 into contact with the surface of the housing 21 of the transmission 20, to retard the rotation of said housing and to reduce the speed of the vehicle sufficiently to eliminate the necessity of resorting to the wheel brakes of said vehicle. As can well be realized, the transmission imparts a fluidity of control to the driver of the vehicle which is not attainable by the use of conventional transmissions. The facility with which the speed of the vehicle may be controlled by the braking action of the controlling means of the transmission thereupon is one of the more important features of my invention.

When the vehicle encounters steep grades or hills, and a loss of momentum causes the clutch means 30 to drop out of contact with the interior of the clutch drum 28, the driver of the vehicle need only press up on the controlling handle 95 of the control means 83 to bring the friction block 85 of the controlling means into contact with the surface of the transmission housing 21 to throw the transmission into low gear. In this manner, light vehicles are able to cope with grades upon which they cannot ordinarily successfully maneuver when equipped with conventional clutches and transmissions.

It is also possible to start the engine of a vehicle equipped with my transmission by pushing the vehicle, since the user of the vehicle need only pull up on the control handle 95 to throw the transmission into low gear. The movement of the driving wheel 13 of the vehicle is then transmitted to the drive shaft 23 of the power plant 15 through the transmission 20 and the engine of the vehicle may be started in this manner. Of course, such starting is neither feasible nor possible with conventional centrifugal clutches.

Shown in Figs. 6 and 7 of the drawings is an alternative embodiment of my invention. The transmission 20 is similar so far as the gear train housing, clutch means, and driven means are concerned, the only differences lying in the provision of an automatic controlling means 98 in place of the manually actuatable controlling means 83 disclosed in the previously discussed embodiment, and in the necessity for providing a jack shaft 23' linked to the drive shaft of the motor 15 by a conventional centrifugal clutch (not shown), which will permit the motor to idle when the present embodiment of my invention is associated therewith. Therefore, like parts of the embodiment about to be described will be given the same numerals as used in describing like parts of the previously discussed embodiment.

The housing 21 of the transmission 20 is provided with an annular, integral rim 99 in which is formed a series of threaded openings 100. Adapted to be mounted on the annular rim 99 of the housing 21 is an annular plate 101 which is provided with a plurality of openings 102 adapted to be placed in registry with the openings 100 in the annular rim 99 to permit bolts 103 to be passed therethrough into the openings 100 to secure the plate to the housing. Therefore, the plate 101 is adapted to be rotated in conjunction with and by the rotation of the housing 21 of the transmission 20.

Centrally located upon and formed integrally with the plate 101 is a cylindrical cup 104 which is adapted to serve as a housing for an overrunning clutch 105, a pawl 106 of which is supported within the confines of said housing by means of an elongated arm 107, the lower end of which is attached to the frame 11 by means of a clamp 108. The pawl 106 is provided with a plurality of notches 109, the notches having arcuate bottoms 110 which are so designed that the notches are deeper at the one end than they are at the other. Positioned in the notches are rollers 111 which are adapted to grip the interior of the cup 104 in a manner which will be described below.

When the power plant of a vehicle is started and sufficiently accelerated, the sun gear 34, being rotated upon a shaft 23', causes the rotation of the planetary gears 39 and the concomitant rotation of the ring gear 43 and the housing 21 upon which it is mounted. The movement of the housing 21 causes the concomitant movement of the plate 101 and the cup 104 formed thereupon in a clockwise direction as indicated by the arrow 112 of Fig. 7. The rotation of the cup 104 causes the rollers 111 to become wedged between the wall of the cup 104 and the bottoms 110 of the notches 109 thus locking the housing 21 against further rotation in a clockwise direction and permitting the transmission of power through the shaft 23', the sun gear 34, the planetary gears 39, and the driven means 45.

When the power plant 15 has accelerated sufficiently to throw the clutch means 30 of the transmission 20 into contact with the interior of the clutch drum 28, the housing 21 will be rotated in a counterclockwise direction and the rollers 111 will be freed from their clutching engagement between the wall of the cup 104 and the bottoms 110 of the notches 109 because the clockwise rotation of the cup will cause the rollers to be urged into the deeper ends of the notches 109 to break the lock between the rollers and the walls of the cup 104. Therefore, the shifting from the low-gear phase to the high-gear phase of the transmission is automatically accomplished with no volitional action upon the part of the rider of the vehicle other than the acceleration of the engine 15 thereof.

Although I have shown and described preferred embodiments of my invention for the purpose of illustrating the manner of construction and mode of operation thereof, it is conceivable that changes, modifications, and alterations may be made in the specific details of said embodiments and I, therefore, do not desire to be limited to said specific details but prefer, rather, to be accorded the full scope of the following claims.

I claim as my invention:

1. In a transmission adapted to be mounted upon the drive shaft of a power plant, the combination of: a housing mounted upon the end of said drive shaft, said housing having an annular internal partition formed therein separating said housing's interior into a gear casing and a clutch drum; a sun gear secured to said end of said drive shaft and disposed within said gear casing; at least one planetary gear positioned within said gear casing in operative engagement with said sun gear; a ring gear secured within said gear casing and engaged by said planetary gear; driven means positioned partially within said gear casing and partially within said clutch drum; clutch means secured to that portion of said driven means disposed within said clutch drum and adapted to be urged into engagement with the interior of said drum; and controlling means positioned externally of said housing and in operative engagement therewith, adapted to prevent the rotation of said housing in one direction and to permit its rotation in the other direction.

2. In a transmission adapted to be mounted upon the drive shaft of a power plant, the combination of: a housing mounted upon the end of said drive shaft, said housing having an annular partition formed therein separating the interior of said housing into a gear casing and a clutch drum; a sun gear secured to said end of said drive shaft within said gear casing; at least one planetary gear positioned within said gear casing in operative engagement with said sun gear; a ring gear secured within said gear casing and engaged by said planetary gear; driven means positioned partially within said gear casing and partially within said clutch drum; clutch means secured to that portion of said driven means which is housed within said clutch drum and including oppositely disposed arcuate shoes adapted to impinge upon the interior surface of said drum; and controlling means positioned in operative relationship with and externally of said housing adapted to prevent the rotation of said housing in one direction and to permit the rotation of said housing in the other direction.

3. In a transmission adapted to be mounted upon the drive shaft of a power plant, the combination of: a housing; a sun gear secured to the end of said drive shaft; at least one planetary gear positioned in said housing in operative engagement with said sun gear; a ring gear secured within said housing and engaged by said planetary gear; driven means disposed within said housing, said driven means including a first portion encompassing said drive shaft and projecting from said housing and a second portion positioned adjacent the end of said shaft and wholly enclosed within said housing, asid housing being mounted upon the second portion of said driven means; clutch means mounted upon the second portion of said driven means and adapted to be urged into engagement with the interior of said housing; and controlling means positioned externally of and in contiguity to said housing and being adapted to restrain said housing from rotation in one direction and to permit said housing to be rotated in the other direction.

EDWARD C. LA VOQUE.

References Cited in the file of this patent

UNITED STATES PATENTS

| Number | Name | Date |
|---|---|---|
| 680,825 | Westinghouse | Aug. 20, 1901 |
| 1,180,697 | Cobb | Apr. 25, 1916 |
| 1,316,564 | Eisterhold | Sept. 23, 1919 |
| 1,396,821 | Drew et al. | Nov. 15, 1921 |
| 1,416,996 | Stucatur | May 23, 1922 |
| 1,978,416 | Dodge | Oct. 30, 1934 |
| 1,983,661 | Frantz et al. | Dec. 11, 1934 |
| 2,007,304 | Padgett | July 9, 1935 |
| 2,011,101 | Dodge | Aug. 13, 1935 |